United States Patent

[11] 3,627,703

| [72] | Inventors | Katsuyoshi Kojima<br>Tokyo-to;<br>Yujiro Nakayama, Yokkaichi-shi, both of Japan |
|---|---|---|
| [21] | Appl. No. | 868,228 |
| [22] | Filed | Oct. 21, 1969 |
| [45] | Patented | Dec. 14, 1971 |
| [73] | Assignee | Mitsubishi Petrochemical Company Limited<br>Tokyo-to, Japan |
| [32] | Priority | Oct. 31, 1968 |
| [33] |  | Japan |
| [31] |  | 43/79423 |

[54] POLYPROPYLENE RESIN COMPOSITES AND PRODUCTION THEREOF
13 Claims, No Drawings

[52] U.S. Cl. .................................................. 260/2.1 E,
260/2.2 R, 260/2.5 R
[51] Int. Cl. ..................................................... C08f 29/12
[50] Field of Search ........................................... 260/2.2, 2.1 E

[56] References Cited
UNITED STATES PATENTS

| 2,681,319 | 6/1954 | Bodamer ...................... | 260/2.1 |
| 2,681,320 | 6/1954 | Bodamer ...................... | 260/2.2 |
| 3,024,207 | 3/1962 | Shaw et al. .................... | 260/2.1 |

FOREIGN PATENTS 9,477 10/1959 Japan ..........................

Primary Examiner—Melvin Goldstein
Attorneys—Robert E. Burns and Emmanuel J. Lobato ABSTRACT: A polypropylene resin composite which comprises a polypropylene resin matrix that is both microscopically foamed and molecularly oriented in three dimensions and an ion-exchanging material dispersed therein, which composite is produced by a process which comprises subjecting a precursor composite comprising a solid polypropylene matrix and an ion-exchange material of greater swellability to a chemical treatment comprising an acid treatment and an alkali treatment.

POLYPROPYLENE RESIN COMPOSITES AND PRODUCTION THEREOF

BACKGROUND OF THE INVENTION

This invention relates generally to polypropylene resin composites and more particularly to the production of polypropylene resin composites each of which comprises a fine ion-exchanging material dispersed in a finely foamed polypropylene matrix.

As one kind of ion-exchanger a composite which comprises an ion-exchanging material dispersed in a synthetic resin matrix is known and is used, in the form of a membrane, as an ion-exchange membrane. An ion-exchange membrane which comprises a particulate ion-exchanging resin attached to a support of a synthetic fiber screen is also known. These ion-exchange membranes are heterogeneous in their structures.

Such a heterogeneous ion-exchange membrane is said to be superior in its mechanical strength to an ion-exchange membrane which is a membrane of ion-exchanging material itself. The mechanical strength of the heterogeneous membrane, however, is not fully satisfactory, so that there are several limitations in the practical uses thereof. For example, in order to improve the practicability of the heterogeneous membrane by strengthening the chemical structure thereof it is necessary to increase the degree of cross-linking in the structure thereby to reduce the swellability of the membrane, which in turn reduces the concentration of the ion-exchanging groups. The degree of cross-linking and the concentration of ion-exchanging groups in the ion-exchange resin should preferably be in appropriate balance, but ion-exchange membranes now on the market are, in genera, impractical on account of their lack of this balance. That is, the membranes swell excessively when they are in an aqueous solution and shrink when they are dried, whereby the membranes become deformed or cracked. Accordingly, it is absolutely necessary to use the membranes in a wet state and at room temperature, which necessity is a bar to a practical use thereof in an ion-exchange apparatus.

In addition, other possible uses of the ion-exchange membranes in which the ion exchangeability is utilized are also precluded by the lack of flexibility therein.

SUMMARY OF THE INVENTION

It is an object of the present invention to overcome the disadvantage found in the uses of the conventional ion-exchange membranes.

A further object of the invention is to provide an ion-exchanging composite based on a polypropylene resin which is substantially free of the above disadvantages found in the prior ion-exchange membranes.

Another object of the invention is to provide a process for producing a polypropylene resin composite.

According to the present invention in one aspect thereof, briefly summarized, there is provided a polypropylene resin composite which comprises an ion-exchange material finely dispersed in a polypropylene resin matrix that is molecularly oriented and is microscopically foamed.

According to another aspect of the present invention, briefly summarized, there is provided a process for producing a polypropylene resin composite which comprises preparing a mixture comprising a polypropylene resin and an ion-exchange material having a swellability (or a degree of swelling) of at least 3, the weight ratio of the resin to the material being in the range of 2:8 to 8:2, forming the resultant mixture into a shaped body, and treating the shaped body with an acid and with an alkali, thereby to obtain a polypropylene resin composite which comprises an ion-exchange material finely dispersed in a polypropylene resin matrix that is molecularly oriented and is microscopically foamed.

Thus, the polypropylene resin composite in a certain shape according to the invention is characterized in that the matrix thereof is a polypropylene resin and in that the polypropylene resin is molecularly oriented and microscopically foamed, which structural characteristic is produced by the chemical treatment of the shaped body. The composite has various advantages resulting possibly from the above characteristics which are not obvious, such as the following.

1. The polypropylene resin composite is flexible, and has good mechanical strength in spite of its greater content up to 80 percent of the ion-exchanging material. Since the prior ion-exchange membranes are unsatisfactory in this respect, whereby they are used in the ion-exchange apparatus only with difficulty, this property of the present composite is of great advantage.

This property is unique to a matrix which is of polypropylene resin so far as the matrixes we have studied are concerned and is generated only after the chemical treatment, which fact was totally unexpected.

2. It is observed that the matrix is microscopically foamed, and that it is three-dimensionally oriented as is determined by X-ray diffraction. While it is to be understood that the invention is not to be restricted by any theory, it is supposed that the foaming and the orientation are produced by the dimensional difference of the ion-exchange material in the composite created during the chemical treatment in which a polar group capable of ion-exchanging is converted by the treatment from an H-form to an OH-form, or vice versa, or preferably from a neutral or neutralized form to H-form or OH-form in the manner: Na-salt form $\rightleftarrows$ H-form and ½ $SO_4$-salt form $\rightleftarrows$ OH-form, for example.

The cell size of the foamed matrix is much smaller than that produced by a conventional foaming process. It is, in general, less than 500 microns, and is 200 to 5 microns and ordinarily of the order of approximately 70 microns when the matrix is to be used for an ion-exchange membrane.

The smaller size of the cells is considered to have a great influence on the properties of the composite.

It is generally important that the various conditions included in foaming be in good agreement in order to obtain good foamed bodies. Polyolefins do not easily produce good foamed bodies because of lack of this good agreement or, in other words, because of the poor viscosity characteristic in the presence of a foaming or blowing agent.

It is believed, accordingly, that the foaming conditions created in the chemical treatment according to the invention are suitably in good agreement, so that a good foamed body is obtainable. The phenomenon found in the case of a polypropylene resin matrix is interesting, because no foamed bodies have been produced when polyethylene, polystyrene and poly(vinyl chloride) are used respectively as the matrix.

3. The polypropylene resin composite can be formed into an ion-exchange membrane which has good electrical and mechanical properties. It is believed that such good properties are produced due to the fact that an ion-exchange material having lower degree of cross-linking and higher concentration of ion-exchanging groups is composited in considerable quantities and due to the fact that the matrix is a polypropylene resin which is both foamed and oriented.

The ion-exchange membrane is resistant to being deformed or damaged by air drying, changes in humidity, and chemical actions, and therefore is more practical than the conventional ion-exchange membranes.

4. The polypropylene resin composite is flexible, has high mechanical strength, and has a pleasant tactile feel. It is wettable as well because of the presence therein of an ion-exchanging material.

Thus, this polypropylene resin composite is a novel material, and interesting applications thereof making good use of the above characteristics, other than that as an ion-exchange membrane, are highly possible.

DETAILED DESCRIPTION

The material to be used as a matrix in the invention in order to obtain such advantages and utility is a polypropylene resin. The term "polypropylene resin" herein used means propylene polymers inclusive of isotactic homopolypropylene and copolymers of propylene containing a minor amount of comonomer or comonomers such as ethylene-propylene copolymers which preferably are resinous. Propylene polymers having Vicat softening temperatures of not less than 125° C. are, in general, useable. Any mixture of one of the propylene polymers with one another and with another polymer or polymers compatible therewith are usable provided that the mixture contains propylene as the major component thereof.

As the ion-exchanging material to be dispersed in the composite, any ion-exchanging material which is anionic, cationic, amphoteric, or another ionic type may be used. Preferably, the ion-exchange or another ionic type may be used. Preferably, the ion-exchange materials are anion-exchange resins and cation-exchange resins which are stable at the melting point of the polypropylene resin to be used as a matrix and under the conditions of the chemical treatment and drying.

The ion-exchanging material has a swellability (or a degree of swelling) which is not less than 3. The term "swellability" herein used is that conventionally and generally used in the art of ion-exchange resins and is defined as the ratio of the volume in a swollen state to the volume in a shrunken state during use thereof. Since it has been considered in the prior art that the swellability should be as low as possible and be of the order of, for example, 0.1 to 1.0, the ion-exchange resins which are the preferable embodiments of the ion-exchange material according to the present invention are contradictory to what was believed to be common sense in the prior art.

Preferable anion-exchange resins are those in which the resin matrix or backbone is of a resin structure such as those of epoxies, polyvinyls, polystyrenes, polyallylics, or polyphenolics, and in which ion-exchange group is a primary, secondary or tertiary amino group or a quarternary ammonium group, such as those prepared by the process disclosed in the Japanese Pat. Publication No. 16070/67.

Preferable cation-exchange resins are those in which a resin matrix or backbone is of a resin structure such as those of polystyrenes, polystyrene-butadienes, polyvinyls, or polyphenolics, and in which the ion-exchange group is sulfonic, phosphonic, phosphinic, or carboxylic.

The ion-exchange material should preferably be in finely divided form such as particles of sizes less than 100 mesh.

Preparation of the ion-exchange resins which have swellabilities of at least 3 does not constitute any part of the present invention. Ion-exchange resins which have swellabilities of at least 3, in general, are less cross-linked or are combined with a resin, which preferably is ion-exchangeable, of greater swellability.

The mixing ratio of the polypropylene resin to the ion-exchange material is suitably in the range of 2:8 to 8:2 by weight. The selection of the specific ratio depends generally on the intended use of the resultant composite.

The mixing procedure can be any of those which assure production of a homogeneous mixture of the polypropylene resin and the ion-exchange material. Preferably, the two essential ingredients are kneaded by means of a kneader, a pair of rolls or an extruder, and are fully kneaded at a temperature above the melting point of the polypropylene resin used. Kneading at such a high temperature is preferably carried out in an inert atmosphere in order to prevent oxidation during the process. Any additive such as an antioxidant, a coloring agent, or a filler can be added during this step, although such additives can be added during another step.

The forming or molding can also be carried out by any conventional procedure. The mixture prepared as described above is formed into a suitable shape such as a fiber, a film or a sheet by means of a conventional extruder, a pair of rolls or a pressing machine, or it is formed into a cylinder or a tube by means of blow-molding or extrusion. The step of plastification of the resin mixture which is to be carried out prior to the forming step can, of course, be substituted by the kneading step.

The formed body thus produced is then treated with an acid and with an alkali. Any acid and any alkali which can form an aqueous solution can be utilized, although a strong mineral acid such as sulfuric acid or hydrochloric acid and a strong base such as an alkali metal hydroxide, e.g., sodium hydroxide are preferable. Preferably, the acid and the alkali are each in an aqueous solution with a concentration of 1 to 20 percent by weight.

The chemical treatment is desirably carried out at a relatively high temperature such as above 60° C. The time of the treatment depends on the concentrations of acid and alkali solutions used and/or the temperature used and/or the thickness of formed body. In one embodiment of the invention, the times for the acid treatment and the alkali treatment are each 5–6 hours when the aqueous solutions of sodium hydroxide and hydrochloric or sulfuric acid each of a concentration of 1–20 percent by weight are employed at a temperature of 90°–100° C. for each solution.

The acid treatment and the alkali treatment are carried out in sequence. The sequential order is not critical, but we have found that it is desirable to carry out the acid treatment after the alkali treatment for the anionic composite, and the alkali treatment after the acid treatment for the cationic composite. Upon completion of the chemical treatment, the composite is washed with water and dried. The chemical treatment can be carried out in an organic liquid medium which is a nonsolvent of the propylene resin and the ion-exchange material used, if desired.

We have found that better results are obtainable, if the composite to be chemically treated is subjected to a treatment with hot water (60°–100° C.) for an appropriate time, for example, of 3 to 24 hours.

In order to indicate still more fully the nature and utility of the invention, the following specific examples of practice constituting embodiments thereof are set forth, it being understood that these examples are presented as illustrative only and they are not intended to limit the scope of the invention.

EXAMPLE 1

This example demonstrates the preparation of ion-exchange resins.

1. Anion-exchange resin

Fifty parts (by weight) of epichlorohydrin and 20 parts of bisphenol-A are caused to react in the presence of sodium hydroxide as a catalyst under heat, thereby to obtain an epoxy intermediate (A) which has a molecular weight less than 200 and is a liquid at room temperature.

A mixture of 40 parts of pentaethylenehexamine and 20 parts of diaminodiphenyl methane is prepared and is maintained in a heated condition while 10 parts of ethylene oxide is gradually introduced thereinto and is caused to condense partially.

To this latter product, 30 parts of the epoxy intermediate (A) is added portionwise under stirring, and the resultant mixture is heated at a temperature maintained at about 50° C. until a viscous intermediate (B) is obtained.

The intermediate (B) thus obtained is heated to about 50° C. so as to complete the curing reaction and to evaporate off water and other volatiles. It is then thrown into water so as to become swollen and broken down, is washed with dilute acid and alkali solutions to remove any contaminant, is dried, and is then pulverized.

As a result, there is obtained an anion-exchange resin the swellability of which is 10.

2. Cation-Exchange resins i. One-hundred parts of styrene monomer containing 0.5 part of added divinylbenzene is subjected to suspension polymerization catalyzed by a catalyst such as benzoyl peroxide thereby to produce a copolymer in the form of fine grains or powder.

The copolymer is sulfonated with oleum, and there is obtained a strongly acidic cation-exchange resin (D) the concentration of ion-exchange groups and the swellability of which are 55 milliequivalent/gram and 8, respectively.

ii. One-hundred parts of methacrylic acid containing 0.5 part of added divinylbenzene is subjected to catalytic polymerization which proceeds slowly at a temperature of 60° to 70° C. thereby to produce a viscous liquid product.

To the product thus produced, 80 parts of the cation-exchange resin powder (D) and a further quantity of the catalyst are added, and the resultant mixture is heated until the completion of polymerization. The solid mass thus produced is caused to swell with an aqueous sodium hydroxide solution, then crushed, washed with water, and dried.

There is thus obtained a cation-exchange resin (E) the swellability of which is 10.

EXAMPLE 2.

Thirty-five parts of polypropylene (specific gravity = 0.91) is caused to melt under heat and stirred in a kneader, into which 65 parts of the anion-exchange resin (C) is added and the resultant mixture is thoroughly admixed under heat and stirring in a nitrogen atmosphere to produce, after 10 minutes, a homogeneous dispersoid melt. The melt is rolled into a sheet at a temperature of about 175° C. and the sheet is further pressed under a pressure of over 250 kg./cm.$^2$ into a membrane 1' of 0.4 mm. thickness after cooling.

This membrane is immersed in warm water and then heated for 5 hours with a gradual increase of the temperature of water up to boiling. The membrane thus treated is then immersed in a 5 percent aqueous sulfuric acid solution, which is then caused to boil, and is maintained within the boiling solution for over 5 hours. The membrane thus treated is then treated with a boiling 5 percent aqueous sodium hydroxide solution for over 5 hours. The membrane after the chemical treatment is washed with hot water and with a dilute acid solution until the wash becomes neutral. A modified membrane 1 is obtained after dewatering and drying.

A membrane 2 is produced in accordance with the above procedure except that an anion-exchange resin (X) containing a quaternary ammonium group attached to a styrene-divinylbenzene copolymer is used instead. The swellability of the anion-exchange resin is 3.5.

A membrane 3, which is a reference, is produced which differs from the membrane 2 only in the swellability. The swellability of the anion-exchange resin used in the membrane 3 is 1.2.

These membranes have physical characteristics set forth in table I and electrochemical properties set forth in table IV.

For the sake of comparison, reference examples were carried out in which 50 parts of the anion-exchange resin (C) was mixed with 50 parts each of polyethylene, polystyrene, and polyvinylchloride, and the resultant mixtures were formed into membranes according to the above-described procedures. The membranes, before being subjected to chemical treatment, were so poor in their mechanical properties that they could not be subjected to the tests.

Further, the membranes were subjected to the chemical treatment at 100° C. and at 75° C. respectively. In either case, for each membrane, no foaming and no stretching or molecular orientation occurred, and the mechanical strength was further lowered so that no tests could be carried out thereon.

EXAMPLE 3

The procedure of example 2 is followed except that the polypropylene content in the mixture thereof with the anion-exchange resin (C) and the conditions of the chemical treatment are those recorded in table II.

The properties of these membranes are set forth in table II.

TABLE II

| No. | Polypropylene content (percent by weight) | Chemical treatment Temp. (° C.) | Time (hr.) | Foaming ratio width (percent) | Tensile strength (kg.) | Flexibility |
|---|---|---|---|---|---|---|
| 1 | 20 | (1) | (1) | | 1.1 | Poor. |
| | | 100 | 5, each | (2) | 1.2 | Do. |
| | | (1) | (1) | | 5.2 | Do. |
| | | 100 | 5, each | 1.25 | 13.5 | Good. |
| 2 | 50 | 95 | 3, each | 1.15 | 7.8 | Fairly good. |
| | | 95 | 5, each | 1.26 | 13.8 | Good. |
| | | 70 | 15, each | 1.15 | 7.3 | Fairly good. |
| 3 | 80 | (1) | (1) | | 7.0 | Poor. |
| | | 100 | 5, each | 1.20 | 13.0 | Do. |

$^1$ Not treated.
$^2$ Not measurable.

EXAMPLE 4

Thirty-five parts of polypropylene (Sp. gr. = 0.91) is heated to melt in a kneader, into which 65 parts of the cation-exchange resin (E) is added. The resultant mixture is heated under vigorous stirring in a nitrogen atmosphere to produce, after about 10 minutes, a homogeneous dispersoid melt. The melt is rolled at 175° C. and then pressed under a pressure over 250 kg./cm.$^2$ into a membrane 4' after cooling.

The membrane is immersed in warm water, and is heated for 5 hours with a gradual increase of the temperature of water up to boiling. The membrane thus treated is then immersed in a 5 percent aqueous sodium hydroxide solution, which is then caused to boil, and is maintained within the boiling solution for over 5 hours. The membrane thus treated is then treated with a boiling 5 percent aqueous sulfuric acid solution for over 5 hours, after which it is neutralized and washed with hot water. The membrane is dewatered, and air-dried under heat between pressure plates, whereupon a modified membrane 4 is obtained.

A membrane 5 is produced by the above procedure except that a cation-exchange resin containing a sulfonic group attached to a styrene-divinylbenzene copolymer is used instead. The swellability is 4.

A membrane 6, which is a reference, is produced which differs from the membrane 5 only in swellability. The swellability of the cation-exchange resin used in the membrane 6 and 1.

These membranes have physical characteristics set forth in table III and electrochemical properties set forth in table IV.

TABLE I

| Sample No. | Chemical treatmeat | Sp. gr. | Foaming ratio $^1$ | Cell dia. ($\mu$) $^1$ | Increase in the dimension through the chem. treat, percent | | | Orientation $^2$ | Tensile strength (kg.) $^3$ | | Flexibility |
|---|---|---|---|---|---|---|---|---|---|---|---|
| | | | | | Thickness | Width | Length | | Width | Length | |
| 1' | No | 0.908 | | | | | | Uniaxial | 4.45 | 7.35 | Poor. |
| 1 | Yes | 0.704 | 1.29 | 62 | 18.0 | 15.0 | 1.0 | Three-dimensional | 11.25 | 12.23 | Good. |
| 2 | Yes | 0.725 | 1.11 | 70 | 8.2 | 6.0 | 0.5 | do | 9.65 | 10.35 | Do. |
| 3 | Yes | 0.907 | | | | | | Uniaxial | 4.5 | 7.4 | Poor. |

$^1$ By means of a microscope.
$^2$ By means of X-ray diffraction.
$^3$ By means of an Autograph.

TABLE III

| Sample No. | Chemical treatment | Sp. gr. | Foaming ratio (percent) | Cell dia. (μ) | Increase in the dimension through the chem. treat., percent | | | Orientation | Tensile strength (kg.) | | Flexibility |
| --- | --- | --- | --- | --- | --- | --- | --- | --- | --- | --- | --- |
| | | | | | Thickness | Width | Length | | Width | Length | |
| 4' | No | 0.956 | | | | | | Uniaxial | 8.7 | 10.4 | Poor. |
| 4 | Yes | 0.756 | 1.27 | 78 | 10.0 | 13.0 | 3.0 | Three-dimensional | 9.5 | 10.5 | Good. |
| 5 | Yes | 0.794 | 1.02 | 72 | 4.3 | 5.1 | 1.2 | do | 9.2 | 10.5 | Do. |
| 6 | Yes | 0.960 | | | | | | Uniaxial | 8.7 | 10.4 | Poor. |

EXAMPLE 5

Several ion-exchange membranes are produced by the procedure as set forth in example 2 or 4 in which various ion-exchange resins are used. The results of tests carried out on these membranes are set forth in table IV.

Membranes in which polyethylene is used as a matrix and homogeneous ion-exchange membranes available on the market were tested, the results being set forth in table IV.

In table IV, the symbols for the types of ion-exchanging materials are as follows:

C   See example 1—1.
E   See example 1—2.—ii.
AX  Quarternary ammonium, styrene-divinylbenzene copolymer
KX ( ) Sulfonic, styrene-divinylbenzene copolymer
AY  Quarternary ammonium, styrene-butadiene copolymer
KY  Sulfonic, styrene-butadiene copolymer The symbols PP and PE in the column of "matrix" in table IV stand for polypropylene and polyethylene, respectively.

Further, symbols P...G, S...G, P...NG, and S...NG in the column of "workability when air-dried" stand for performance is good, strength is good, performance is no good, and so on.

For example 1 g. of dry anion-exchanging material is treated with an aqueous alkali solution thereby to convert completely the anion-exchange groups to OH groups. The material thus treated is caused to contact a dilute aqueous acid solution thereby to undergo ion-exchange. The quantity of the acid ions exchanged for the OH groups, expressed in terms of milliequivalent, corresponds to the concentration. The concentration is equivalent to the total ion-exchanging capacity per gram of a dry material.

2. The specific resistance means the value of electrical resistance of a material of 1 cm. of the length and of 1 cm.² of the cross section.

The data set forth in table IV are expressed in terms of specific resistance (Ω-cm.) determined by a conventional method for ion-exchange membranes in which an alternating current is applied across the membrane in a 0.5N NaCl solution.

3. The cracking angle means the dihedral angle through which the membrane is bent around a round metal bar of 2 mm. diameter.

We claim:

1. A polypropylene resin composite in the form of a flexible, membrane, fiber, film, sheet or tube which comprises a polypropylene resin matrix which is both microscopically foamed and molecularly oriented in three dimensions, said polypropylene resin having a Vicat softening temperature of not less than 125° C., the cell size of the foamed matrix being less than 500 microns, and an ion-exchange resin finely

TABLE 4

| Run No. | Type of membrane | Type of ion-exchange material | Matrix | | Temp. of chem. treatment (°C.) | Swellability | Concentration of ion-exchange group (*-1) | Specific resistance (Ω cm) (*-2) | Cracking angle (degree) (*-3) | Workability when air-dried |
| --- | --- | --- | --- | --- | --- | --- | --- | --- | --- | --- |
| | | | Type | Content in the composite (percent by wt.) | | | | | | |
| 1 | Example 2 | Anion | C | PP | 35 | 100 | 10 | 6.2 | 80 | 130 | P .....G S .....G |
| 2 | do | C | PP | 55 | 100 | 10 | 3.8 | 250 | 110 | P .....G S .....G |
| 3 | Example 4 | Cation | E | PP | 35 | 100 | 10 | 4.8 | 110 | 120 | P .....G S .....G |
| 4 | do | E | PP | 55 | 100 | 10 | 3.1 | 310 | 105 | P .....G S .....G |
| 5 | Example 2 | Anion | AX | PP | 35 | 100 | 3.5 | 0.7 | 600 | 100 | P .....G S .....G |
| 6 | Example 4 | Cation | KX | PP | 35 | 100 | 4 | 1.0 | 500 | 100 | P .....G S .....G |
| 7 | Reference Ex | Anion (on the market) | AX | PP | 35 | 100 | 1.2 | 0.5 | 850 | 30 | P .....NG S .....G |
| 8 | do | do | AX | PP | 55 | 100 | 1.2 | 0.2 | 2,300 | (¹) | P .....NG S .....G |
| 9 | do | Cation (on the market) | KX | PP | 35 | 100 | 1 | 0.8 | 550 | 75 | P .....NG S .....G |
| 10 | do | do | KX | PP | 55 | 100 | 1 | 0.4 | 1,800 | (¹) | P .....NG S .....G |
| 11 | do | Anion | C | PE | 35 | 75 | 10 | 6.3 | 160 | (¹) | P .....NG S .....G |
| 12 | do | do | C | PE | 55 | 75 | 10 | 1.9 | 1,300 | (¹) | P .....NG S .....NG |
| 13 | Reference Ex. (homogeneous, on the market) | do | AY | Applied on a polyester backing screen. | | | | 1.0 | 110 | (¹) | P .....NG S .....NG |
| 14 | do | Cation | KY | do | | | | 1.1 | 125 | (¹) | P .....NG S .....NG |

¹ Non-bendable.

Note
1. The concentration of ion-exchange group means the quantity of chemically attached ion-exchange groups in the material, expressed in terms of milliequivalent of the group/gram of the dry material.

dispersed in said matrix, said ion-exchange resin having a swellability of at least 3, the dry particle size of said ion-exchange resin being less than 100 mesh and the weight ratio of said polypropylene resin to said ion-exchange resin being in the range of 2:8 to 8:2.

2. A composite as claimed in claim 1 in which said microscopically foamed matrix has a cell size of 500 to 5 microns.

3. A composite as claimed in claim 1 in which said microscopically foamed matrix has a cell size of 200 to 5 microns.

4. A composite as claimed in claim 3 in which said microscopically foamed matrix has a cell size of the order of 70 microns.

5. A composite as claimed in claim 1 in which said polypropylene resin is an isotactic polypropylene.

6. A composite as claimed in claim 1 in which said composite is in the form of a membrane.

7. A composite as claimed in claim 1 in which said composite is in the form of a tube.

8. A process for producing a polypropylene resin composite which comprises preparing a mixture comprising a polypropylene resin and an ion-exchanging material having a swellability of at least 3 and a particle size of less than 100 mesh, the weight ratio of said resin to said material being in the range of 2:8 to 8:2, forming the resultant mixture into a membrane, fiber, film, sheet or tube in which said resin constitutes a matrix, and subjecting the shaped body to a chemical treatment comprising an acid treatment with an aqueous solution of a strong mineral acid and an alkali treatment with an aqueous solution of an alkali metal hydroxide, thereby to cause the matrix to be both microscopically foamed and molecularly oriented in three dimensions.

9. A process as claimed in claim 8 in which said acid treatment comprises immersing the shaped body in a bath of an aqueous solution of a strong mineral acid under heat.

10. A process as claimed in claim 8 in which said alkali treatment comprises immersing the shaped body in a bath of an aqueous solution of an alkali metal hydroxide under heat.

11. A process as claimed in claim 8 in which the shaped body is anionic and is subjected first to the alkali treatment and then to the acid treatment.

12. A process as claimed in claim 8 in which the shaped body is cationic and is subjected first to the acid treatment and then to the alkali treatment.

13. A process as claimed in claim 8 in which the shaped body is heated in water and then is subjected to the chemical treatment.

* * * * *